W. A. BANCROFT.
AUTOMATIC SAFETY CUT-OFF FOR COMBUSTIBLE FLUID DISTRIBUTING SYSTEMS.
APPLICATION FILED APR. 2, 1917.
1,332,283. Patented Mar. 2, 1920.
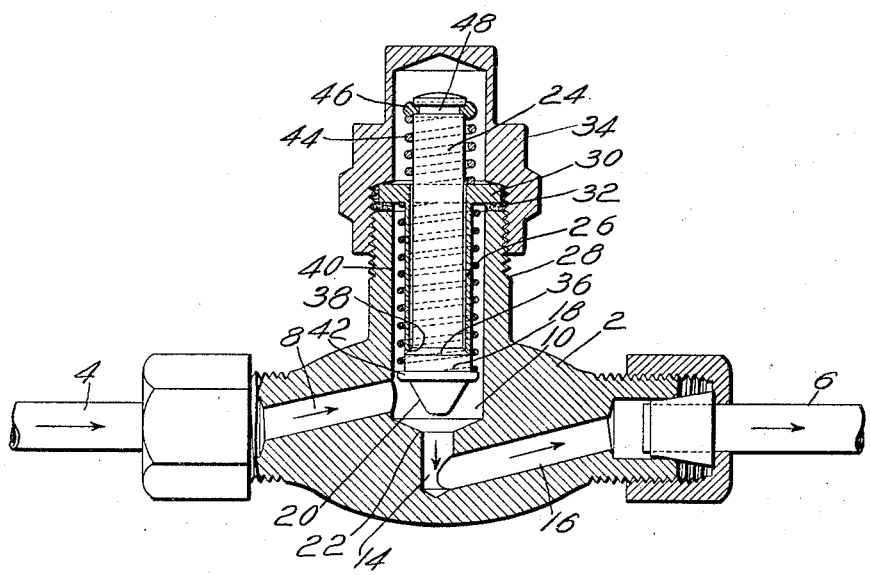
Inventor
William A. Bancroft
by his Attorneys
Van Everen Fish & Hildreth

UNITED STATES PATENT OFFICE.

WILLIAM A. BANCROFT, OF WATERTOWN, MASSACHUSETTS.

AUTOMATIC SAFETY CUT-OFF FOR COMBUSTIBLE-FLUID-DISTRIBUTING SYSTEMS.

1,332,283.   Specification of Letters Patent.   Patented Mar. 2, 1920.

Application filed April 2, 1917. Serial No. 159,266.

*To all whom it may concern:*

Be it known that I, WILLIAM A. BANCROFT, a citizen of the United States, residing at Watertown, in the county of Middlesex and State of Massachusetts, have invented certain new and useful Improvements in Automatic Safety Cut-Off for Combustible-Fluid-Distributing Systems; and I do hereby declare the following to be a full, clear, and exact description of the invention, such as will enable others skilled in the art to which it appertains to make and use the same.

This invention relates to automatic safety cut-offs for combustible fluid-distributing systems.

The invention is intended particularly for use in connection with hydro-carbon motors for cutting off the fuel-supply between the fuel reservoir and the carbureter in case of fire. It is not limited, however, to use in connection with the fuel distributing systems of hydrocarbon motors, but may be applied with advantage to other combustible fluid distributing systems.

As is well known to those familiar with the operation of hydro-carbon motors, the motor is liable to backfire through the carbureter and set fire to the fuel in the carbureter. The fire thus developed is fed by the fuel flowing through the supply pipe from the reservoir. The destruction of the carbureter float allows the intake valve to open wide, so that the fuel then flows freely from the reservoir to the carbureter. It is important, when the fuel in the carbureter is set on fire, to cut off the fuel supply from the reservoir, as the fuel in the carbureter will then usually burn out without doing any considerable damage. The fuel supply line between the carbureter and the reservoir is often not supplied with a shut-off cock. Even in case a shut-off cock is provided, the closing of same by hand is attended with considerable danger after the fire has started.

The object of the present invention is to provide an improved automatic safety cut-off for combustible fluid distributing systems which is simple in construction, sensitive and quick acting, and which will operate in a uniformly certain and reliable manner to cut off the supply of fluid in case of fire.

With this object in view, a feature of the invention contemplates the provision, in connection with a valve casing, of a double-acting valve mounted on a valve stem extending from the interior to the exterior of the valve casing, and arranged to engage one valve seat to prevent the flow of the combustible fluid along the valve stem to the exterior of the casing when in open position, and to engage another valve seat to cut off the supply of combustible fluid. This construction enables a thermally controlled device for holding the valve in open position to be connected with the valve stem on the exterior of the casing, where it is exposed to changes in temperature in proximity to the casing, while leakage of the combustible fluid about the valve stem is wholly prevented without interfering with the rapid operation of the valve.

Other features of the invention consist of certain improved constructions, arrangements and combinations of parts hereinafter described and particularly pointed out in the claims, the advantages of which will be readily understood by those skilled in the art.

In the drawing illustrating the invention in its preferred form, the figure is a view in longitudinal section of a device embodying the invention.

The device illustrated in the drawing comprises a casing 2 connected at one end with a pipe 4 and at the other end with a pipe 6 forming parts of a combustible fluid distributing system. The pipe 4 is preferably the inlet pipe for the casing, and the pipe 6 the outlet pipe, the arrows in the drawing indicating the direction of flow of the fluid. The casing 2 is provided with an inclined passageway 8 communicating at its outer end with the inlet pipe 4 and leading to a valve chamber 10 within the casing. The chamber 10 communicates through the short vertical passageway 14 with an inclined passageway 16 which leads to the passageway in the outlet pipe 6.

The cut-off valve is mounted in the valve-chamber 10. This cut-off valve comprises a valve head 18 formed with a cone-shaped valve face 20 arranged to engage a valve seat 22 formed on the casing 2 to cut off communication between the chamber 10 and the passageway 14, and thereby cut off the flow of fluid through the casing. The valve head 18 is secured to the lower end of a valve stem 24 arranged to slide in a sleeve 26 mounted in a cylindrical boss 28 formed on the casing 2. The sleeve 26 is provided with a flange 30 engaging a gasket 32 interposed between the upper end of the boss 28 and the flange. The sleeve 26 is held in place by a cap 34 threaded upon the boss 28 and engaging the upper side of the flange 30 at its margin. By screwing the cap 34 down tightly against the flange, the flange is forced against the gasket 32 to form tight joints between the upper end of the boss 28, the gasket, the flange and the cap.

The valve head 18 is formed with a second cone-shaped valve face 36 arranged to engage a correspondingly-shaped valve seat 38 formed on the lower end of the sleeve 26, when the valve is in position with the valve face 20 lifted away from the valve seat 22 so as to allow the fluid to flow freely through the valve casing. This may be termed the open position of the valve. A coiled spring 40 surrounding the sleeve 26 and interposed between the flange 30 on the sleeve and a flange 42 on the valve head is provided to actuate the valve to engage the valve face 20 with the valve seat 22 when the valve is released. The valve head is held in open position by means of a coiled spring 44 surrounding the valve stem and interposed between the upper end of the sleeve 26 and a ring 46 embedded in a groove 48 formed in the upper end of the valve stem. The strength of the spring 44 is considerably greater than that of the spring 42, so that the spring 44 will hold the valve head normally in open position, as shown in the drawings, against the tension of the spring 40. The spring 44 also will act to force the valve face 36 tightly against the valve seat 38 to prevent leakage of the combustible fluid between the valve stem 24 and the sleeve 26 when the valve is open. The ring 46 is made of a metal having a relatively low fusing temperature. The upper end of the valve stem projects into the chamber 50 in the cap 34.

The valve is shown in the drawing in open position or with the valve face 20 disengaged from the valve seat 22 and with the valve face 36 held in engagement with the valve seat 38 by the action of the coiled spring 44. With the valve in this position the fluid can flow freely from the inlet pipe 4 through the passageway 8, the valve chamber 10 and the passageways 14 and 16 to the outlet pipe 6. When a fire starts in proximity to the casing the ring 46 fuses quickly under the heat transmitted thereto. Upon the fusing of the ring 46 the valve stem 24 is released from the action of the coiled spring 44. The coiled spring 40 will then act to force the valve head downwardly to engage the valve face 20 with the valve seat 22, thereby cutting off the flow of the combustible fluid through the casing 2. It will be noted that with this construction the outer end of the valve stem which carries the fusible ring 46 is located outside of the casing 2 where it is not surrounded by the combustible fluid, and where it is particularly susceptible to the action of heat transmitted by a fire developed in proximity to the casing. It is not essential that the cap 34 form a housing inclosing the outer end of the valve stem 24, as shown in the drawing, but it may be found to be desirable to make this cap in the form of a collar, the central bore in which is open at its outer end so that the flame or heated air or gas from the fire may have direct access to the fusible ring 46. With the construction and arrangement of parts shown in the drawing, the closing of the valve allows the fluid within the casing to flow from the chamber 10 between the valve stem and the sleeve into the chamber 50 in the cap 34. To obviate the difficulty when a cap having an open end is used, the casing 2 is then applied to the fluid distributing system in a position reverse to that in which it is shown in the drawing, so that the fluid will enter the casing through the passageway 16, will then pass through the passageway 14 into the chamber 10, and will pass from the chamber out of the casing through the passageway 8. It is found, however, that with the cap constructed as shown in the drawings so as to inclose the outer end of the valve stem, the fusible ring will become quickly heated to the fusing point by the heat transmitted thereto from the fire in proximity to the casing. It is to be noted that in the construction shown the coiled spring 40 is surrounded by the fluid inside the chamber after the valve head is actuated to cut off the fluid supply so the heating of the spring 40 to a high temperature is prevented. The overheating of the spring would result in a loss of temper by the spring. The tension of the spring might not then be sufficient to maintain the valve face 20 firmly engaged with the valve seat 22.

Having explained the nature and object of the invention, and having specifically described a device embodying the same in its preferred form, what is claimed is:

1. An automatic safety cut-off for combustible fluid distributing systems, having, in combination, a valve casing, a sleeve mounted on the casing with its opening extending from the interior to the exterior of the casing, a valve seat formed on the inner end of the sleeve, a valve stem mounted in the sleeve, with its outer end projecting from the outer end of the sleeve, a double acting valve mounted on the inner end of the valve stem and arranged to engage the valve seat on the inner end of the sleeve when in open position and to engage the valve seat on the valve casing when in closed position, a coiled spring surrounding the sleeve for actuating the valve to engage it with the valve seat on the valve casing, and a thermally-controlled device to engage the valve stem outside of the casing to hold the valve in open position.

2. An automatic safety cut-off for combustible fluid distributing systems, having, in combination, a valve casing, a sleeve mounted on the casing with its opening extending from the interior to the exterior of the casing, a valve seat formed on the inner end of the sleeve, a valve stem mounted in the sleeve, with its outer end projecting from the outer end of the sleeve, a double acting valve mounted on the inner end of the valve stem and arranged to engage the valve seat on the inner end of the sleeve when in open position and to engage the valve seat on the valve casing when in closed position, a coiled spring surrounding the sleeve for actuating the valve to engage it with the valve seat on the valve casing, a thermally-controlled device engaging the valve stem outside of the casing, and a coiled spring interposed between said device and the sleeve to hold the valve in engagement with the valve seat on the inner end of the sleeve.

3. An automatic safety cut-off for combustible fluid distributing systems, having, in combination, a valve casing, a valve stem extending from the interior to the exterior of the casing, two valve seats, a double-acting valve mounted on the end of the valve stem within the casing and arranged to engage one valve seat when in open position to prevent the leakage of fluid about the valve stem and to engage the other valve seat to cut off the fluid supply, a thermally-controlled device engaging the end of the valve stem outside of the casing, and a spring acting against said device to hold the valve in open position in engagement with the first valve seat.

4. An automatic safety cut-off for combustible fluid distributing systems, having, in combination, a valve casing, a valve stem extending from the interior to the exterior of the casing, two valve seats, a double-acting valve mounted on the end of the valve stem within the casing and arranged to engage one valve seat when in open position to prevent the leakage of fluid about the valve stem and to engage the other valve seat to cut off the fluid supply, a spring for actuating the valve to engage it with the second valve seat, a thermally-controlled device engaging the end of the valve stem outside of the casing, and a spring having a greater tension than the first spring and acting against said devices to hold the valve in open position in engagement with the first valve seat.

WILLIAM A. BANCROFT.